(12) United States Patent
Liu et al.

(10) Patent No.: US 10,638,294 B2
(45) Date of Patent: Apr. 28, 2020

(54) BLUETOOTH TRANSMISSION INTEGRATED CIRCUIT AND ASSOCIATED METHOD

(71) Applicant: Realtek Semiconductor Corp., HsinChu (TW)

(72) Inventors: Yu-Hsuan Liu, Hsinchu (TW); Yu-Fang Chiu, Yunlin County (TW); Ya-Hsueh Huang, Kaohsiung (TW); Yi-Lin Li, Hsinchu (TW); Ju-Chun Wu, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/024,917

(22) Filed: Jul. 2, 2018

(65) Prior Publication Data
US 2019/0007817 A1 Jan. 3, 2019

(30) Foreign Application Priority Data
Jul. 3, 2017 (TW) .............................. 106122225 A

(51) Int. Cl.
*H04B 7/00* (2006.01)
*H04W 4/80* (2018.01)
*H04W 8/00* (2009.01)
*H04W 52/02* (2009.01)

(52) U.S. Cl.
CPC ............. *H04W 4/80* (2018.02); *H04W 8/005* (2013.01); *H04W 52/0209* (2013.01); *H04W 52/0235* (2013.01)

(58) Field of Classification Search
CPC ................................ H04W 4/80; H04W 8/005
USPC ......................................................... 455/41.2
See application file for complete search history.

(56) References Cited

U.S. PATENT DOCUMENTS

| | | | |
|---|---|---|---|
| 9,548,869 B2 * | 1/2017 | Redding | H04L 12/1827 |
| 9,820,135 B2 * | 11/2017 | Wang | H04W 4/80 |
| 10,091,638 B2 * | 10/2018 | Wang | H04W 4/80 |
| 2003/0012219 A1 * | 1/2003 | Joo | H04L 29/06 370/449 |
| 2017/0134925 A1 * | 5/2017 | Keranen | H04W 76/10 |
| 2017/0374629 A1 * | 12/2017 | Ramappa | H04W 4/80 |

FOREIGN PATENT DOCUMENTS

| | | | |
|---|---|---|---|
| TW | 201316806 A1 | 4/2013 | |
| TW | 201626737 A | 7/2016 | |

* cited by examiner

*Primary Examiner* — Sonny Trinh
(74) *Attorney, Agent, or Firm* — Winston Hsu

(57) ABSTRACT

A Bluetooth Integrated Circuit includes a receiver, a transmitter, and a control circuit. The receiver circuit is configured to receive a scan request packet from an electronic device, and the scan request packet being transmitted by the electronic device in accordance with a Bluetooth wireless low energy standard. The transmitter circuit is configured to transmit a data packet or an advertising packet, and the control circuit is coupled to the receiver circuit and the transmitter circuit. When the receiver circuit receives the scan request packet, the control circuit detects a transmission rate at which the scan request packet is transmitted by the electronic device and controls the transmitter circuit to transmit the data packet or the advertising packet at the data rate related to the scan request packet.

11 Claims, 5 Drawing Sheets

BLUETOOTH TRANSMISSION INTEGRATED CIRCUIT AND ASSOCIATED METHOD

BACKGROUND OF THE INVENTION

1. Field of the Invention

The present invention relates to a Bluetooth integrated circuit (IC), and more particularly, to a Bluetooth transmission IC operating in a low energy (LE) Coded mode, and an associated method.

2. Description of the Prior Art

In the Bluetooth 4.0 standard, an LE Bluetooth mode is presented. The LE Bluetooth mode has a relatively low transmission rate compared to the traditional Bluetooth mode, but occupies less bandwidth and consumes less power. The LE Bluetooth mode may be applied to a short range application, e.g. the iBeacon technology presented by Apple Inc. As well as the 1 Mb transmission rate presented by the Bluetooth 4.0 standard, another two transmission rates are presented in the Bluetooth 5 standard, which are the LE 2M mode and the LE Coded mode, wherein the LE 2M mode means the transmission rate can reach 2 Mb/s, and the LE Coded mode means the transmitted packet can be further coded. By encoding the packet, the transmission rate for the packets transmitted in the LE Coded mode can be changed to increase the chance of receiving packets at the receiver end. In the Bluetooth 5 standard, the LE Coded mode can define the code being used in the access header of the packet. According to the codes, different transmission rates (125 Kb/s or 500 Kb/s) can be obtained, and the transmission distance for the packets can be increased by lowering the transmission rate. The Bluetooth transmission still has a high chance of failing, however.

SUMMARY OF THE INVENTION

One of the objectives of the present invention is to provide a Bluetooth transmission IC operating in a LE Coded mode, and an associated transmitting method, to increase the success rate of packet transmission.

According to an embodiment of the present invention, a Bluetooth transmission integrated circuit (IC) is disclosed, comprising: a receiver circuit, a transmitter circuit and a control circuit, wherein the receiver is configured to receive a scan request packet from an electronic device, and the scan request packet being transmitted by the electronic device in accordance with a Bluetooth wireless Low Energy (LE) standard; the transmitter circuit is configured to transmit a data packet or an advertising packet; and the control circuit is coupled to the receiver circuit and the transmitter circuit; wherein when the receiver circuit receives the scan request packet, the control circuit detects a transmission rate at which the scan request packet is transmitted by the electronic device and controls the transmitter circuit to transmit the data packet or the advertising packet with the transmission rate of the scan request packet.

According to an embodiment of the present invention, a Bluetooth transmission method is disclosed, comprising: utilizing a receiver circuit to receive a scan request packet from an electronic device, the scan request packet being transmitted by the electronic device in accordance with a Bluetooth wireless Low Energy (LE) standard; and utilizing a transmitter circuit to transmit a data packet or an advertising packet; wherein when the receiver circuit receives the scan request packet, detecting a transmission rate at which the scan request packet is transmitted by electronic device and controlling the transmitter circuit to transmit the data packet or the advertising packet with the transmission rate related to the scan request packet.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
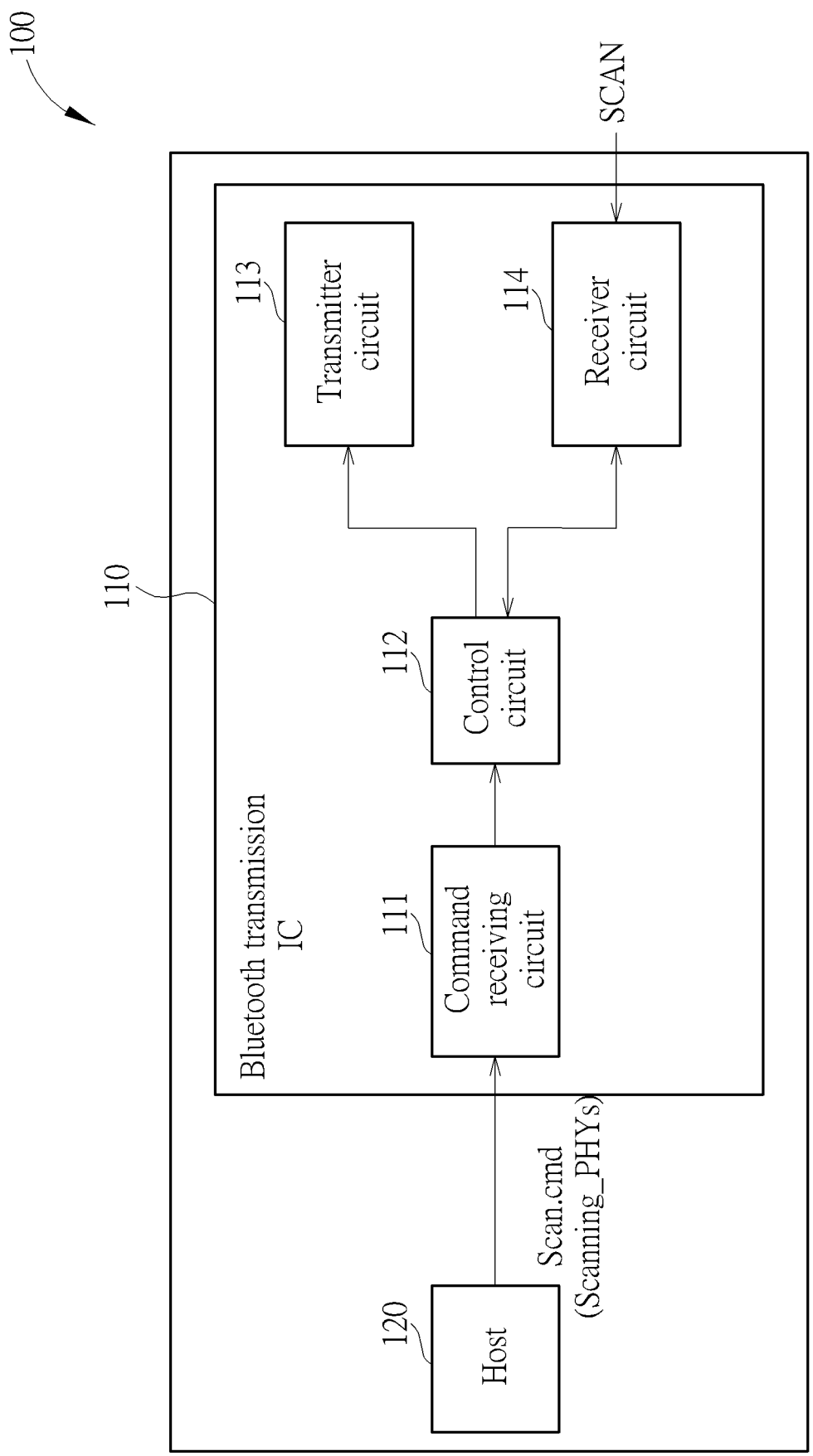
FIG. 1 is a diagram illustrating an electronic device executing a Bluetooth transmission scan according to an embodiment of the present invention.
Figure 2:
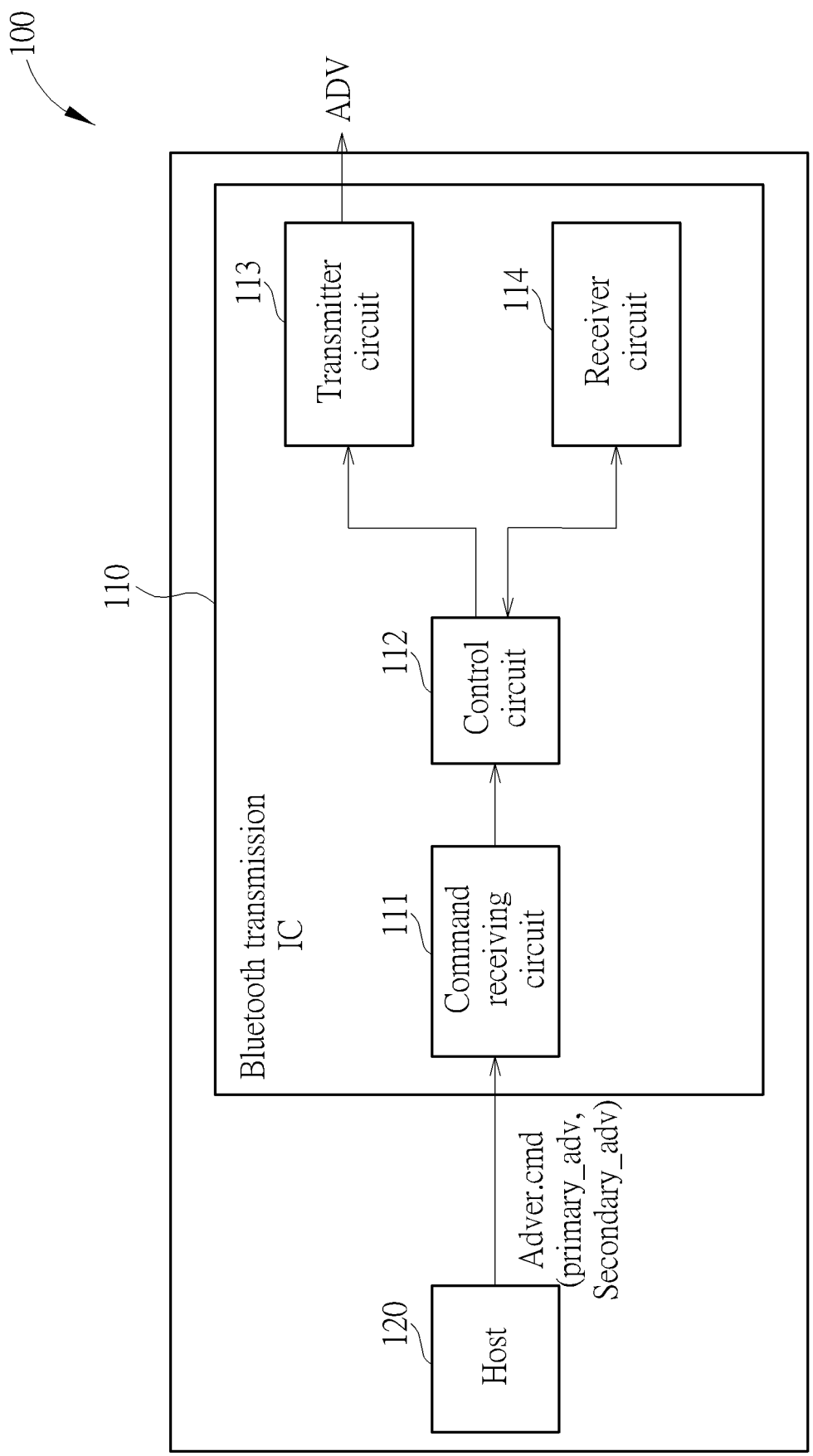
FIG. 2 is a diagram illustrating an electronic device executing a Bluetooth transmission advertisement according to an embodiment of the present invention.
Figure 3:
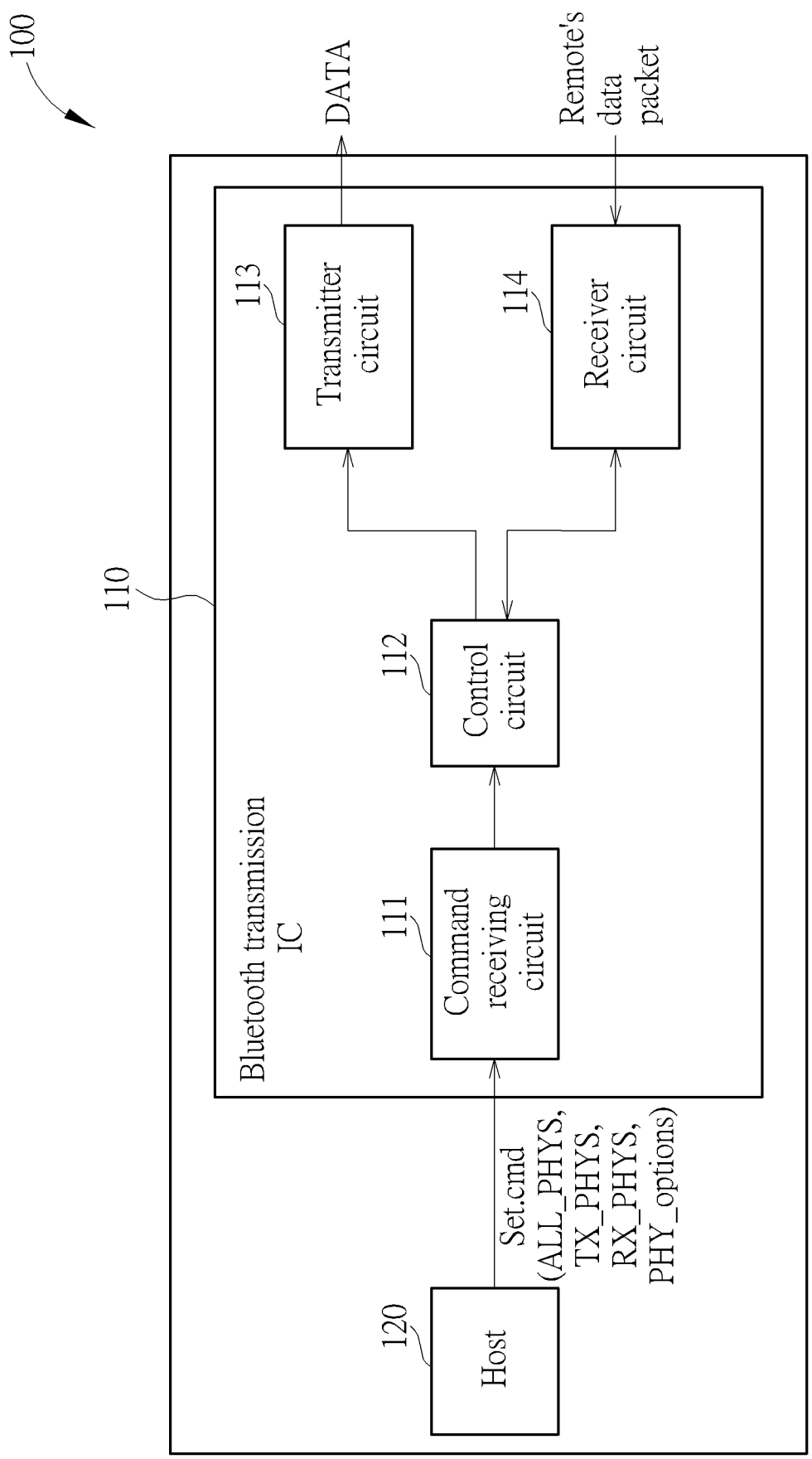
FIG. 3 is a diagram illustrating an electronic device successfully completing a Bluetooth connection according to an embodiment of the present invention.

FIG. 1 to FIG. 3 are diagrams illustrating an electronic device 100 applying a Bluetooth transmission integrated circuit (IC) circuit 110 according to different embodiments of the present invention. As shown in FIG. 1, the electronic device 100 comprises a host 120 and the Bluetooth transmission IC 110, wherein the Bluetooth transmission IC 110 comprises a command receiving circuit 111, a control circuit 112, a transmitter 113 and a receiver 114. Each of the embodiments of FIG. 1 to FIG. 3 illustrate the host 120 (which can be a processor in other embodiments) installed within the electronic device 100 issuing specific commands to make the Bluetooth transmission IC 110 enter a LE Coded mode, and according to the communication requirements, three different scenarios can be summarized.

When the electronic device 100 has not built a Bluetooth connection with other devices, the host 120 (or a processor) of the electronic device 100 can issue a Host Control Interface (HCI) command to the Bluetooth transmission IC 110 to enable the electronic device 100 receive (or scan) packets as a receiver. More specifically, as shown in FIG. 1, the HCI command issued by the host 120 can be an LE scan command Scan.cmd (e.g. HCI_LE_Set_Extended_Scanning_Parameters). The LE scan command Scan.cmd is transmitted to a command receiving circuit 111 for requesting the receiver 114 to receive (or scan) a scan request packet SCAN sent by another device via the control circuit 112. In this embodiment, the received (scanned) scan request packet SCAN is sent by the other devices. It should be noted that, in the Bluetooth 5 standard, the LE scan command Scan.cmd comprises a plurality of parameters, and one of the plurality of parameters is a scan parameter Scanning_PHYs. By scanning the value of the scan parameter Scanning_PHYs, the receiver 114 can be defined to scan the scan request packet SCAN in the LE 1M mode or the LE Coded mode. For example, when the scan parameter Scanning_PHYs is set to be 0, the advertising packet ADV advertised in the LE 1M mode is sent by the electronic device 100 and received by the other device and the scan request packet SCAN in the LE 1M mode is also transmitted by the other device to the electronic device 100; when the scan parameter Scanning_PHYs is set to be 4, the advertising packet ADV advertised in the LE Coded mode is sent by the electronic device 100 and received by the other device, and then the scan request packet SCAN in the LE Coded mode is transmitted by the other device to the electronic device 100. Please note that the LE scan command Scan.cmd comprises more than the scanning parameters Scanning_PHYs, i.e., there are other parameters defined in the standard. Only the parameters pertinent to the LE Coded mode are illustrated in this embodiment, and other variations and implementations are omitted here for brevity.

When the electronic device 100 has not built the Bluetooth connection, the host 120 (or the processor) of the electronic device 100 can issue an HCI command to the Bluetooth transmission IC 110 to make the electronic device 100 advertise packets as a transmitter. More specifically, as shown in FIG. 2, the HCI command issued by the host 120 is an LE advertising command Adver.cmd (e.g. HCI_LE_Set_Extended_Advertising_Parameters). The LE advertising command Adver.cmd is transmitted to the command receiving circuit 111 to request the transmitter 113 to transmit an advertising packet ADV through the control circuit 112. It should be noted that, in the Bluetooth 5 standard, the LE advertising command Adver.cmd comprises a plurality of parameters, and one of the plurality of parameters is a primary advertising parameter (e.g. Primary_Advertising_PHY) marked as primary_adv in FIG. 2. By setting the value of the primary advertising parameter primary_adv, the advertising packet ADV can be defined to be transmitted in the LE 1M mode or the LE Coded mode. For example, when the primary advertising parameter primary_adv is set to be 1, the advertising packet ADV is advertised in the LE 1M mode; when the primary advertising parameter primary_adv is set to be 3, the advertising packet ADV is advertised in the LE Coded mode. The plurality of parameters further comprises a secondary advertising parameter (e.g. Secondary_Advertising_PHY) marked as secondary_adv in FIG. 2. By setting the value of the secondary advertising parameter secondary_adv, the advertising packet ADV can be defined to be transmitted in the LE 1M mode, the LE 2M mode or the LE Coded mode. For example, when the secondary advertising parameter secondary_adv is set to be 1, the advertising packet ADV is advertised in the LE 1M mode; when the secondary advertising parameter secondary_adv is set to be 2, the advertising packet ADV is advertised in the LE 2M mode; and when the secondary advertising parameter secondary_adv is set to be 3, the advertising packet ADV is advertised in the LE coded mode. Please note that the LE advertising command Adver.cmd comprises more than the primary advertising parameter primary_adv and the secondary advertising parameter secondary_adv, i.e. there are other parameters defined in the standard. This embodiment only illustrates the parameters pertinent to the LE Coded mode, and other implementations are omitted here for brevity.

It should be noted that, in the abovementioned situations, the commands issued by the host 120 are not able to request the electronic device 100 to utilize either 125 Kb/s or 500 Kb/s as the transmission rate for the communication when it receives/transmits packets as a receiver/transmitter.

When the electronic device has successfully built the Bluetooth connection with other devices, the host 120 (or the processor) of the electronic device 100 can issue an LE setting command (e.g. HCI_LE_Set_PHY), marked as Set.cmd in FIG. 3, to the Bluetooth transmission IC 100, wherein the LE setting command Set.cmd comprises a plurality of command parameters such as an overall parameter (marked as ALL_PHYS), a transmitting parameter (marked as TX_PHYS), a receiving parameter (marked as RX_PHYS) and an optional parameter (marked as PHY_options). By setting the value of the transmitting parameter TX_PHYS, the electronic device 100 can be defined to transmit a data packet DATA in the LE 1M mode, the LE 2M mode or the LE Coded mode via the transmitter 113. For example, in the LE setting command Set.cmd issued by the host 120, when the value of the $0^{th}$ bit of the transmitting parameter TX_PHYS is set to be a high level (i.e. the logic value 1), the transmitter 113 could transmit the data packet DATA in the LE 1M mode; when the value of the $1^{st}$ bit of the transmitting parameter TX_PHYS is set to be a high level (i.e. the logic value 1), the transmitter 113 could transmit the data packet DATA in the LE 2M mode; when the value of the $2^{nd}$ bit of the transmitting parameter TX_PHYS is set to be a high level (i.e. the logic value 1), the transmitter 113 could transmit the data packet DATA in the LE Coded mode; and when each of the $0^{th}$ bit to the $2^{nd}$ bit of the transmitting parameter TX_PHYS is set to be a high level (i.e. the logic value 1), the mode for the transmitter 113 transmitting the data packet DATA is not limited. By setting the value of the receiving parameter RX_PHYS, the electronic device 100 can be defined to receive remote side's packet transmitted in the LE 1M mode, the LE 2M mode or the LE Coded mode via the receiver 114. For example, in the LE setting command Set.cmd issued by the host 120, when the $0^{th}$ bit of the receiving parameter RX_PHYS is set to be a high level (i.e. the logic value 1), the receiver 114 can receive the remote side's data packet transmitted in the LE 1M mode; when the $1^{st}$ bit of the receiving parameter RX_PHYS is set to be a high level (i.e. the logic value 1), the receiver 114 can receive the remote side's data packet transmitted in the LE 2M mode; when the $2^{nd}$ bit of the receiving parameter RX_PHYS is set to be a high level (i.e. the logic value 1), the receiver 114 can receive the remote side's data packet transmitted in the LE Coded mode; and when each of the $0^{th}$ bit to the $2^{nd}$ bit of the receiving parameter RX_PHYS is set to be a high level (i.e. the logic value 1), the mode of the remote side's data packet received by the receiver 114 is not limited. By setting the value of the option parameter PHY_options, the electronic device 100 can be defined to utilize either 125 Kb/s or 500 Kb/s, or does not need to indicate the transmission rate for communication when it operates in the LE Coded mode. For example, when the $2^{nd}$ bits of the transmitting parameter TX_PHYS and the receiving parameter RX_PHYS are set to be a high level (i.e. the logic value 1), the electronic device 100 transmits/receives packets in the LE Coded mode, and when the value of the optional parameter PHY_options is set to be 0, the host 120 is not limited to utilize 125 Kb/s or 500 Kb/s as the transmission rate for communication; when the value of the optional parameter PHY_options is set to be 1, the host 120 requests to utilize 500 Kb/s as the transmission rate for communication; and when the value of the optional parameter PHY_options is set to be 2, the host 120 requests to utilize 125 Kb/s as the transmission rate for communication.

Figure 4:
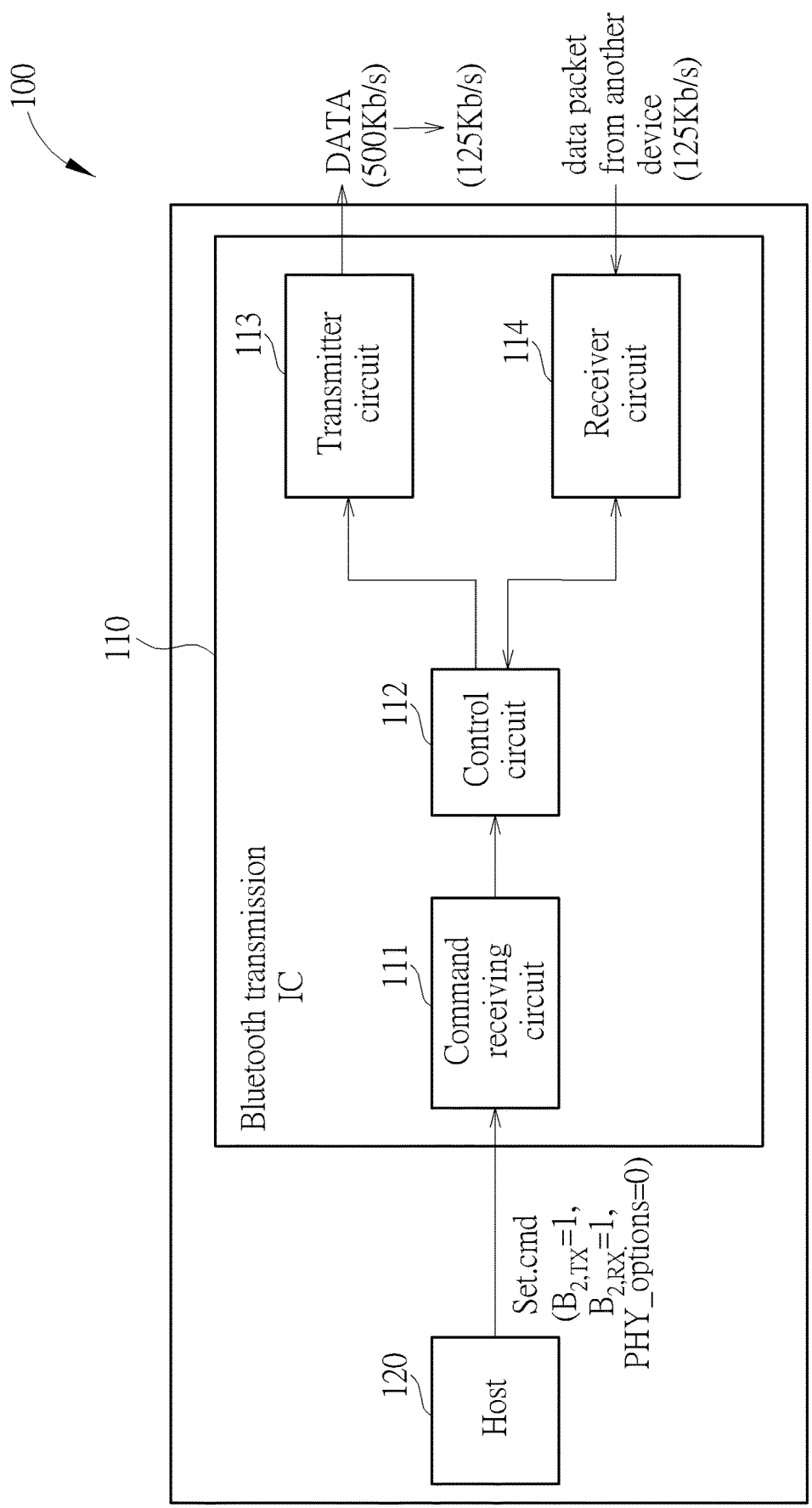
FIG. 4 is an operating diagram illustrating a control circuit according to a first embodiment of the present invention.

When the transmitter end and the receiver end are communicating in the same transmission rate, the success rate for the Bluetooth communication will be greatly increased. Refer to FIG. 4 which is a diagram illustrating the control circuit 112 according to a first embodiment of the present invention. As shown in FIG. 4, the electronic device 100 has successfully built the Bluetooth connection with other devices. According to the setting command Set.cmd issued by the host 120, the electronic device 100 executes a long distance transmission in the LE Coded mode in which the transmission rate for transmitting the data packet DATA is not limited to be 125 Kb/s or 500 Kb/s due to the $2^{nd}$ bit $B_{2,TX}$ of the transmitting parameter TX_PHYS being set to be 1, the $2^{nd}$ bit $B_{2,RX}$ of the Receiving parameter RX_PHYS being set to be 1, and the option parameter PHY_options being set to be 0. Assuming that the transmitter 113 transmits the data packet DATA with 500 Kb/s initially, when the receiver 114 receives the data packet from another electronic device and the control circuit 112 detects that the received data packet is transmitted at 125 Kb/s, the control circuit 112 controls the transmitter 113 to transmit the data packet DATA with 125 Kb/s afterwards to increase the success rate for the Bluetooth data transmission. Likewise, when the data packet DATA is transmitted with 125 Kb/s initially and the data packet from another electronic device is detected to be transmitted at 500 Kb/s, the control circuit 112 controls the transmitter 113 to transmit the data packet DATA at 500 Kb/s afterwards to increase the success rate and data rate for the Bluetooth data transmission.

Figure 5:
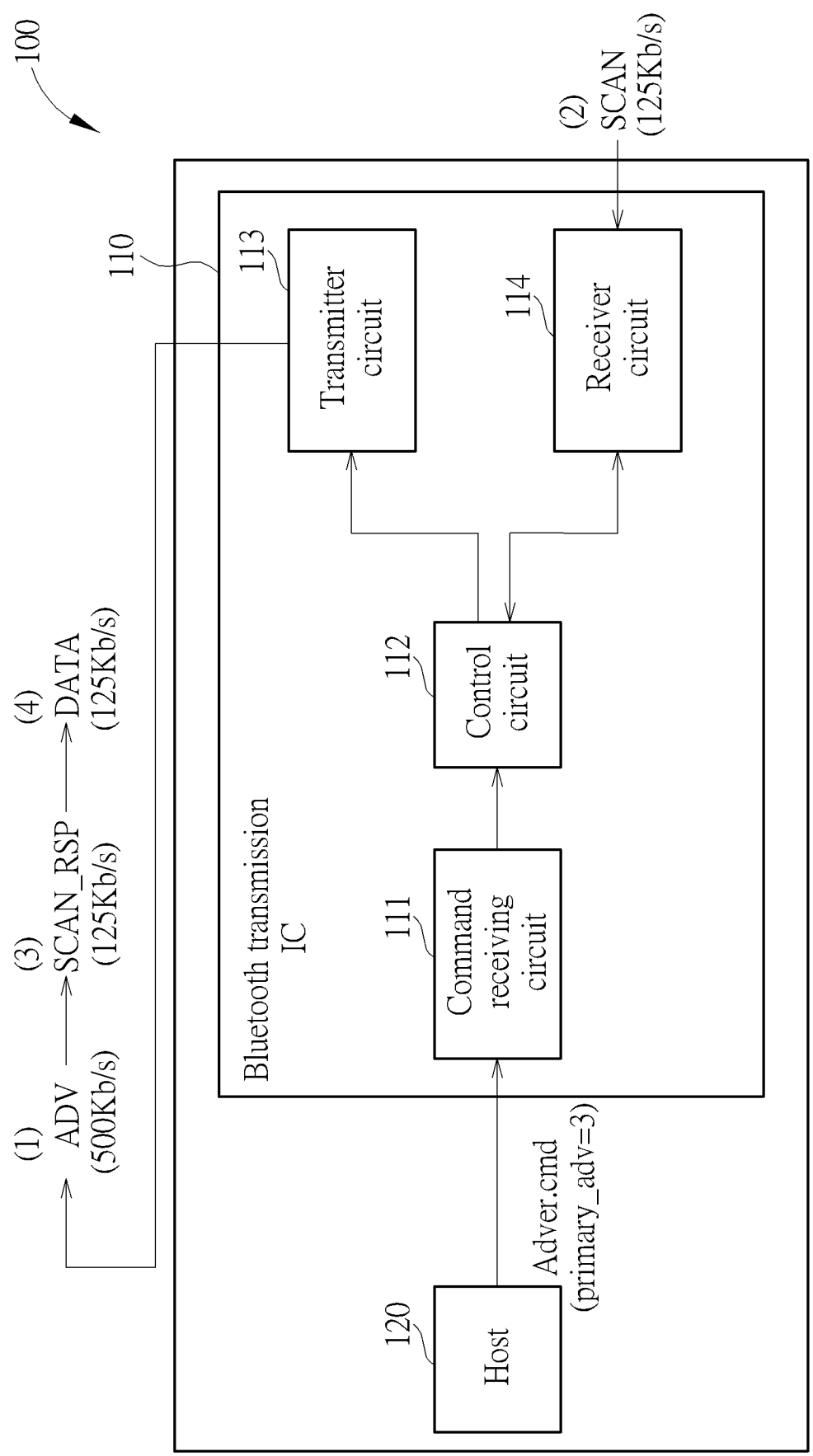
FIG. 5 is an operating diagram illustrating a control circuit according to a second embodiment of the present invention.

FIG. 5 is a diagram illustrating the control circuit 112 according to a second embodiment of the present invention. At this point, the electronic device 100 has yet to build a Bluetooth connection with any device. According to the LE advertising command Adver.cmd issued by the host 120, the electronic device 100 transmits the advertising packet ADV (which is an advertising packet in the LE Coded mode) via the transmitter 113 since the primary advertising parameter Primary_PHY is set to be 3. Since the host 120 has yet to set the transmission rate time, the advertising packet ADV is initially transmitted at 500 Kb/s. When the receiver 114 of the electronic device 100 receives the scan request packet SCAN (which is a packet request for scanning) from another device and the control circuit detects that the scan request packet SCAN transmitted by that device is transmitted at 125 Kb/s, the control circuit 112 controls the transmitter 113 of the electronic device 100 to transmit the scan response packet SCAN_RSP at 125 kb/s to build the BlueTooth connection. After the Bluetooth connection is built, the following data packets are also transmitted at 125 Kb/s to improve the success rate for the Bluetooth communication. In the embodiments of FIG. 4 and FIG. 5, the control circuit 112 is a baseband circuit module; however, this is not a limitation of the present invention.

It should be noted that the embodiments of FIG. 1 to FIG. 5 illustrate the electronic device 100 operating in the LE Coded mode. The Bluetooth transmission IC 110 disclosed by the present invention is not limited to the LE Coded mode, however; the Bluetooth transmission IC 110 can also operate in the LE 1M mode, the LE 2M mode, the traditional Bluetooth mode or the high speed Bluetooth mode.

Briefly summarized, the present invention provides a Bluetooth transmission IC which can detect the transmission rate of packets from another device via the control circuit, and control the transmitter to transmit the packets with the same transmission rate in order to increase the success rate of the Bluetooth communication.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication integrated circuit (IC), comprising:
   a receiver circuit configured to receive a scan request packet from an electronic device, the scan request packet being transmitted by the electronic device in accordance with a Bluetooth wireless low energy standard;
   a transmitter circuit configured to transmit a data packet or an advertising packet; and
   a control circuit coupled to the receiver and the transmitter;
   wherein when the control circuit receives the scan request packet, the control circuit detects a transmission rate at which the scan request packet is transmitted by the electronic device and controls the transmitter circuit to transmit the data packet or the advertising packet at the transmission rate related to the scan request packet;
   wherein when the transmission rate that the wireless communication IC communicates with the electronic device before the receiver circuit of the wireless communication IC receives the scan request packet from the electronic device is different from the transmission rate of the scan request packet received by the wireless communication IC, the control circuit controls the transmitter circuit to utilize the transmission rate of the scan request packet to transmit the data packer or the advertising packet to the electronic device.

2. The wireless communication IC of claim 1, further comprising:
   a command receiving circuit, coupled to the control circuit, wherein the command receiving circuit is arranged to receive a command from a processor, and the command comprises a low energy information.

3. The wireless communication IC of claim 2, wherein the low energy information is low energy scan information, and the control circuit controls the receiver circuit to receive the scan request packet according to the low energy scan information.

4. The wireless communication IC of claim 2, wherein the low energy information is low energy setting information, and the control circuit sets a transmission rate of the data packet or the advertising packet according to the low energy setting information.

5. The wireless communication IC of claim 2, wherein the low energy information is low energy advertising information, and the control circuit controls the transmitter circuit to transmit the data packet or the advertising packet to the electronic device according to the low energy advertising information.

6. The wireless communication IC of claim 1, wherein the control circuit is a baseband circuit module.

7. A Bluetooth transmitting method, comprising:
   utilizing a receiver circuit of a wireless communication integrated circuit (IC) to receive a scan request packet from an electronic device, the scan request packet being transmitted by the electronic device in accordance with a Bluetooth wireless low energy standard; and utilizing a transmitter circuit to transmit a data packet or an advertising packet;

wherein when the receiver circuit receives the scan request packet, detecting a transmission rate at which the scan request packet is transmitted by the electronic device and controlling the transmitter circuit to transmit the data packet or the advertising packet at the transmission rate related to the scan request packet;

wherein when the transmission rate that the wireless communication IC communicates with the electronic device before the receiver circuit of the wireless communication IC receives the scan request packet from the electronic device is different from the transmission rate of the scan request packet received by the wireless communication IC, controlling the transmitter circuit to utilize the transmission rate of the scan request packet to transmit the data packer or the advertising packet to the electronic device.

8. The Bluetooth transmitting method of claim 7, further comprising:

receiving a command from a processor, wherein the command comprises a low energy information.

9. The Bluetooth transmitting method of claim 8, wherein the low energy information is low energy scan information, and the receiver circuit receives the scan request packet according to the low energy scan information.

10. The Bluetooth transmitting method of claim 8, wherein the low energy information is low energy setting information, and the transmitter sets a transmission rate of the data packet or the advertising packet according to the low energy setting information.

11. The Bluetooth transmitting method of claim 8, wherein the low energy information is low energy advertising information, and the transmitter circuit transmits the data packet or the advertising packet to the electronic device according to the low energy advertising information.

* * * * *